United States Patent [19]

Altenheiner et al.

[11] 4,080,043
[45] Mar. 21, 1978

[54] BINOCULAR TELESCOPE

[75] Inventors: Erwin Altenheiner, Hasselborn; Volker Donn, Heidenheim (Brenz); Joachim Hornschu; Walter Jachan, both of Oberkochen; Artur Jung, Heidenheim (Brenz), all of Germany

[73] Assignee: Carl Zeiss-Stiftung, Oberkochen, Germany

[21] Appl. No.: 620,391

[22] Filed: Oct. 7, 1975

Related U.S. Application Data

[63] Continuation of Ser. No. 376,896, Jul. 5, 1973, abandoned.

[30] Foreign Application Priority Data

Apr. 5, 1973 Germany .............................. 2316955

[51] Int. Cl.² .................................................. G02B 7/06
[52] U.S. Cl. ....................................... 350/76; 350/47; 350/70; 350/36
[58] Field of Search ................................ 350/70, 75–77, 350/36, 46, 47

[56] References Cited

U.S. PATENT DOCUMENTS

| 730,972 | 6/1903 | Riglander et al. | 350/74 X |
|---|---|---|---|
| 1,338,241 | 4/1920 | Meling | 350/77 |
| 1,428,478 | 9/1922 | Dunne | 350/75 X |
| 2,271,380 | 1/1942 | Strang et al. | 350/57 |
| 2,811,895 | 11/1957 | Jensen | 350/76 |
| 3,076,381 | 2/1963 | Dowling et al. | 350/76 |
| 3,484,149 | 12/1969 | Becker et al. | 350/76 |
| 3,604,779 | 9/1971 | Reinhold | 350/75 |
| 3,712,704 | 1/1973 | Sato | 350/76 |
| 3,817,594 | 6/1974 | Fischer | 350/70 |

FOREIGN PATENT DOCUMENTS

| 331,580 | 9/1958 | Switzerland | 350/75 |

Primary Examiner—Jon W. Henry
Attorney, Agent, or Firm—Hopgood, Calimafde, Kalil, Blaustein & Lieberman

[57] ABSTRACT

The invention contemplates an improved binocular telescope construction of the variety wherein a bridge provides articulated connection of the two telescope systems, so that by folding at least one of these articulated systems back against a side of the bridge, the instrument may be compacted when not in use. The invention is particularly concerned with provision of a single focusing drive for the focusing optical elements of both telescope systems, the drive being operative regardless of the extent of articulated expansion or contraction of the bridge-connected systems. The invention also features provision of such focusing by movement of optical elements contained within the overall telescope-housing length, so that such length does not change in the course of focusing. Various embodiments are described.

25 Claims, 13 Drawing Figures

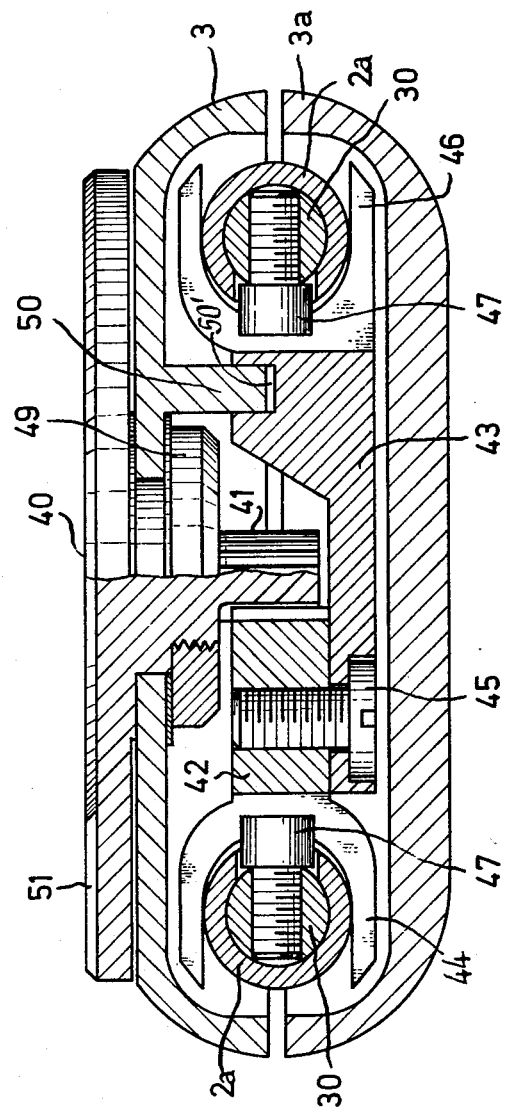
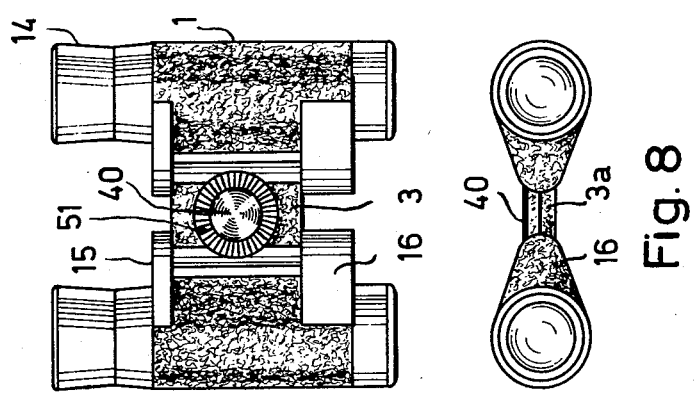

BINOCULAR TELESCOPE

This application is a continuation of our copending application Ser. No. 376,896, filed July 5, 1973 (now abandoned).

This invention relates to a binocular telescope with an articulated connecting bridge between the two individual telescopes, to enable selective adjustment, for use conditions and for compact storage.

Binocular telescopes with adjustable use and storage (packing) features have long been known. They have been devised in order to comply with the need for small handy pocket-size telescopes which in their packed condition have minimum space requirements.

Various solutions for the manufacture of a packing condition of small space requirement have become known. Thus, in German Pat. No. 230,064 a binocular telescope has been disclosed, involving telescopes which are rotatably connected with a frame-like center piece such that they can be fitted completely in the frame. In British Pat. No. 178,415, two individual telescopes are arranged for pivotal movement about two parallel axes which are disposed in the plane of a plate which connects the individual telescopes, and the individual telescopes can be pivoted either together to the same side of the connecting plate or else individually to the front and rear side of the plate. Austrian Pat. No. 286,672 discloses a binocular field glass having a double-articulated connecting bridge between two individual telescopes, offering the possibility of a Z-shaped collapse of the field glass within an unusually small space requirement, while simultaneously having a precise parallel position of the articulation axes. Also, binocular field glasses with a single articulated bridge between two individual telescopes, as shown in Austrian Pat. No. 297,364, have a handy form in their packed condition, the rotatably supported telescope being articulated to the bridge which is fixed to the other telescope. All such telescopic, pivotably, or collapsible binocular telescopes, however, suffer from the shortcoming that focusing must be effected individually at each of the eyepieces or at each of the objectives.

In addition, pivotable binocular telescopes with a drive button for the common focusing of two individual telescopes are known from French Pat. No. 450,592 as well as from the U.S. Pat. No. 1,428,478, however, the focusing disclosed in these patents suffers from the shortcoming that it is connected with a change in the longitudinal dimension of the telescope. And the disclosed embodiments of these patents are inherently insufficient with respect to sealability and are very expensive and complicated regarding their mechanical design.

It is an object of the invention to provide an improved articulated binocular-telescope construction which avoids shortcomings of prior devices.

It is a specific object of this invention to provide a binocular telescope requiring minimum space in its packed condition and providing common focusing of the two individual telescopes, in such manner that no change in volume of the telescope is involved by reason of focusing adjustment.

The invention achieves these objects by providing optical systems wherein the optical parts used for focusing each telescope are contained within the respective telescope tubes, being mounted for coupled axial adjustment by means of an external drive mechanism. The drive mechanism imparts axial displacement to the mount for each focusing element, and a longitudinal guide for each focusing element assures correct optical alignment regardless of the adjusted condition of the binoculars. In a preferred embodiment, the axially movable focusing mount includes an offset or control arm with a boss slidably guided by the pin or shaft by which the bridge is articulated to the particular telescope tube, and an elastic cuff or sleeve is used to seal the drive connection to the mount, where it extends through an opening in the telescope housing.

In manufacture of the binocular telescope, it is advantageous to equip the eyepieces by means of invertible eye cups for spectacle wearers. Thus, correction of a visual defect at the telescope can be omitted; also, either both eyepieces or both objectives can be mounted non-adjustably, and for focusing either both objectives or both eyepieces can be moved together axially by means of a drive button.

Advantageously, plates of glass or transparent plastic may provide fixed closure of the housing in front of the objectives, thereby protecting the objectives without limiting their axial focusing movement.

Coupled focusing of the two telescopes can be effected via a central drive, offset to one side of the objective or the eyepiece, the central drive to each focusing mount including a connection comprising a member mounted on the associated articulating pin or shaft.

It is also possible to effect common focusing via a drive button which is eccentrically mounted on the articulating pin for one telescope, the focusing drive to the other telescope being by way of a member mounted on the articulating pin for said other telescope.

Of course, it is also possible to correct a visual defect of non-spectacle wearers by adapting an eyepiece or an objective for an individual adjustment.

This invention further permits the objectives and eyepieces provided with invertible eye cups to be mounted non-adjustably, all focusing being accomplished with a focusing lens axially movable between the eyepiece and the objective.

In another practical embodiment, the articulating pivot axes of the connecting bridge are designed as hollow shafts and are used to guide the longitudinally movable bar, while the longitudinally unmovable bar protects the mounting against rotation.

In a further illustrative embodiment, each of the articulation pins of the connecting bridge is used as a longitudinally unmovable guide element, to retain optical-axis alignment of the mounting of the optical parts used for focusing, while a bar or rod parallel to the articulation pin is longitudinally movable and is used to couple the drive element to the particular focusing mount.

In an advantageous embodiment of this invention, common focusing of the two telescopes is effected via a drive button arranged in the connecting bridge, the axis of drive-button rotation being parallel to the articulating axes of the bridge, while axial movement for the focusing mounts is derived from a screw connected with the drive button.

In a further advantageous form of the invention common focusing of the two telescopes is effected via a drive button arranged in the connecting bridge, the axis of drive-button rotation being perpendicular to the plane of the articulating axes, while axial movement of the focusing mounts is derived from drive-button rotation, via a radially and a longitudinally movable connecting element.

The connecting elements for transmission of movement can be a gear and a rack, or also a cam disc and a follower pin.

The advantages obtained by the invention particularly reside in provision of a collapsible binocular telescope, with minimum space requirement in a packed condition; the common focusing of the two paths of rays provides a high degree of comfort and ease of handling; and a harmonious appearance is achieved for the telescope, by the central inclusion of the drive button in the connecting bridge.

The binocular telescope of the invention thus permits construction of a binocular telescope of high optical capability, while requiring smallest space, in that the hitherto conventional individual eyepiece focus is replaced by extremely compact focusing mechanism whereby the comfort and ease of use may approach that of much larger binocular telescopes.

A few illustrative embodiments of this invention will now be described more fully with reference to the accompanying drawings, in which:

FIG. 7 is a slightly reduced plan view of the binocular telescope illustrated in FIG. 6, in an unfolded condition;

FIG. 8 is an end elevation of the binocular telescope of FIG. 7, viewed from the objectives end;

FIG. 9 is an enlarged sectional view through the bridge of the telescope of FIG. 6, taken along the line XV—XV;

Figure 12:
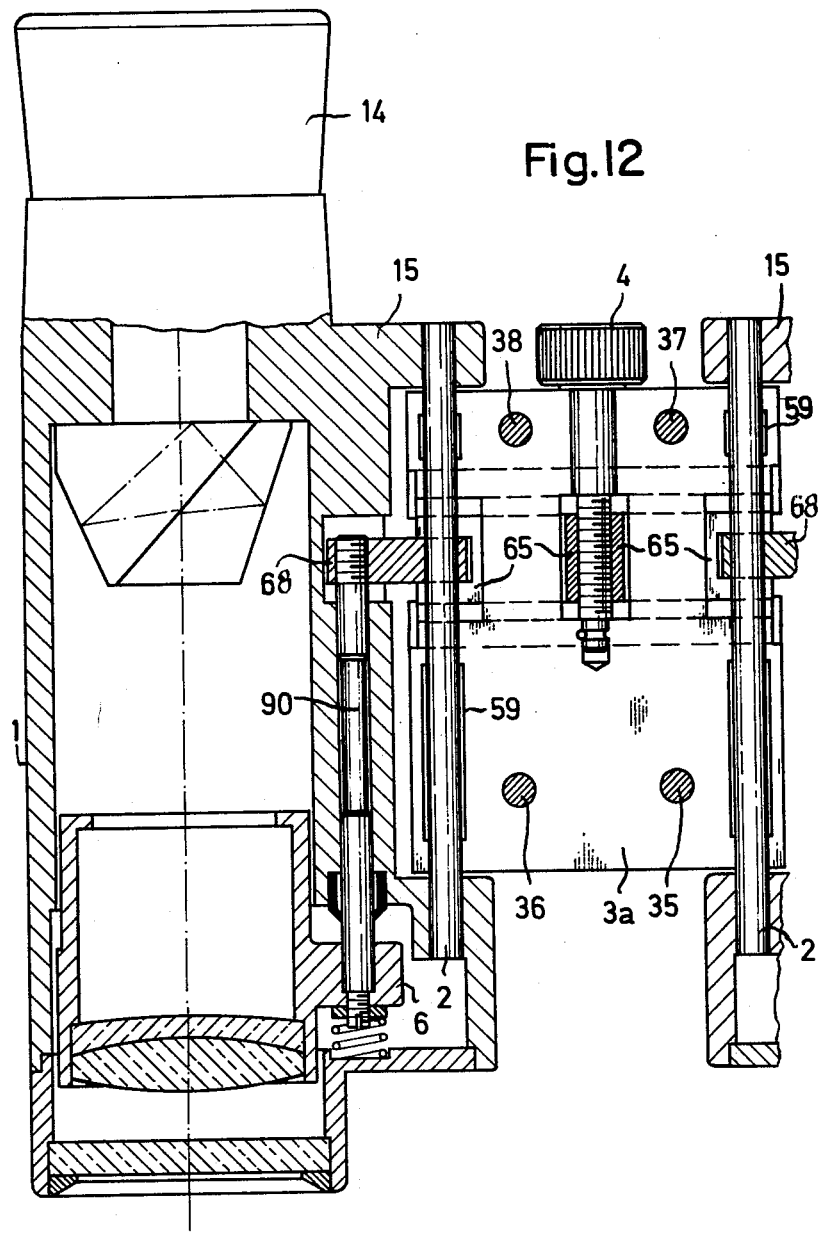
Figure 13:
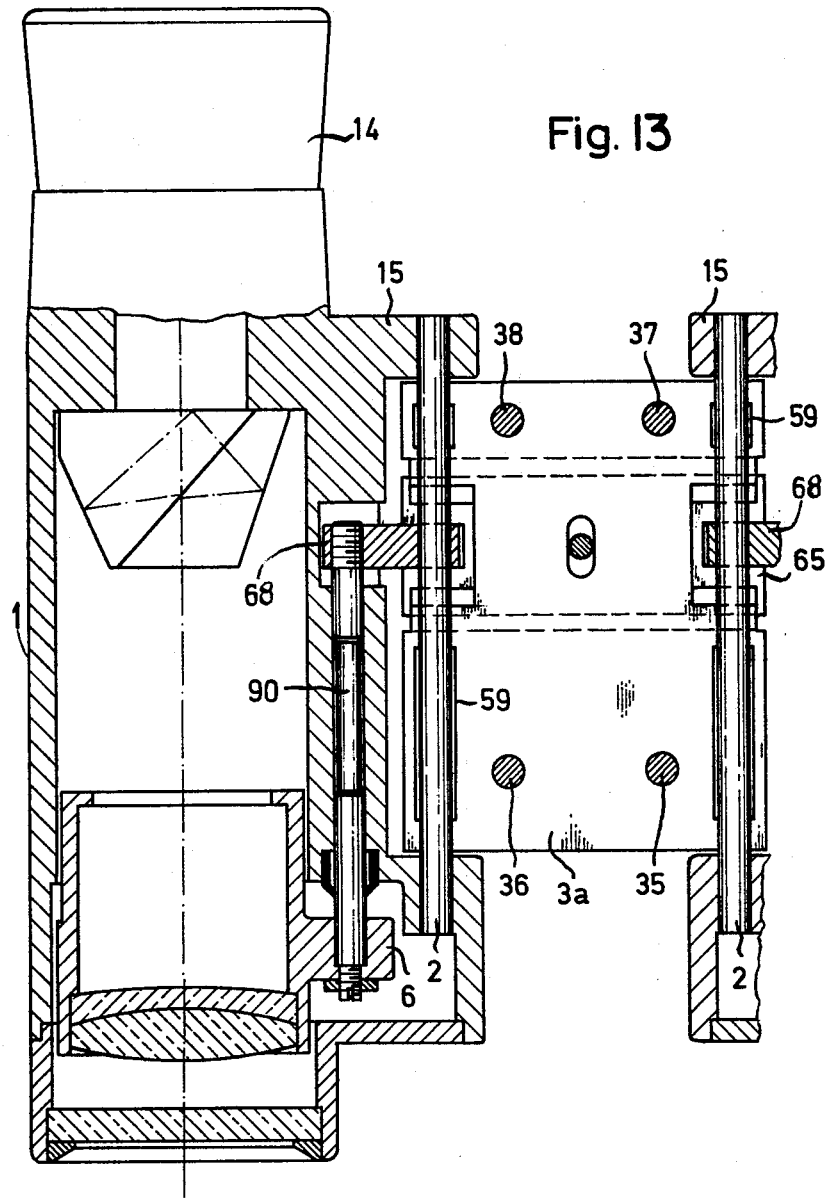

FIG. 12 is a fragmentary longitudinal section through a further embodiment in which the bridge-articulation pins serve as stationary guide elements, serving a longitudinally movable guided element which is moved paraxially by a drive button; and FIG. 13 is a fragmentary longitudinal section through a still further embodiment, involving stationary bridge-articulation pins and a longitudinally movable guided element which is connected with a longitudinally movable bridge part.

In the embodiment of FIGS. 1 to 5, reference numeral 1 designates the left one of two telescope housings which are of identical mechanical and optical design as far as to the central drive. Reference numeral 2a designates a hollow articulation pin, for connection of the left telescope half to the connecting bridge 3. The drive button 4 carries a lead screw 32 and is axially located by end-bearing means 31-33-34; drive motion is picked off by the threaded engagement of yoke 5 to screw 32 and is transmitted by a rod 30 to the focusing mounting 6 of each telescope. Rod 30 is slidably guided by the bore of the hollow articulation pin 2a, and a separate guide pin 9 serves to maintain optical-axis integrity for the focusing element 70, regardless of the extent of focusing adjustment. As shown, rod 30 is secured to the offset of mounting 6, and rod 30 is pivotally connected with the yoke 5. The mounting 6 includes a cylindrical annulus or boss where it surrounds and is connected to the bar 30; mounting 6 also includes a connecting offset arm to a conical annular formation by means of which the focusing lens 70 is positioned in desired axial-offset relation with eyepiece, objective and other parts of the telescope system. The eyepiece 13 is shown equipped with a flexible distance cuff 14 for spectacle wearers. The end bearings 33 and 34 are screws used for positional adjustment of the drive button upon initial assembly. The bridge 3 is of two-part design, being separate upper and lower halves (see 3-3a in FIG. 3), connected by the screws 35-36-37-38. Reference numeral 59 designated recesses in the bridge parts, which enable a friction-free rotation of the hollow articulation pins when the instrument is being unfolded or collapsed. Reference numeral 81 (FIG. 2) designates suitable recesses in the tube housing, for nested reception of exposed parts of the drive button 4, when the instrument is folded in the collapsed condition.

Figure 1:
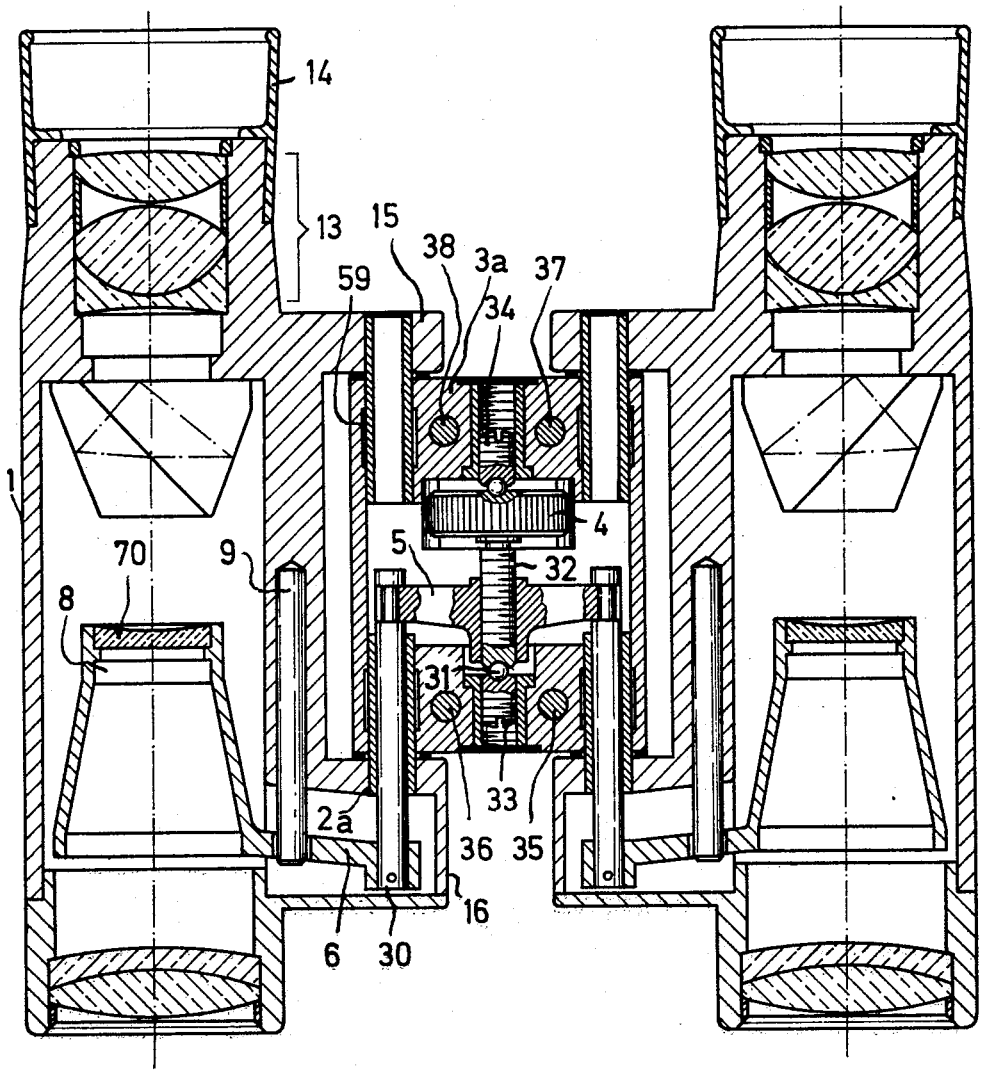
FIG. 1 is an enlarged longitudinal section through a binocular telescope with a double-articulated collapsible connecting bridge, and with central drive focusing of the invention, using hollow articulating-pin connections and a drive button arranged paraxially in the connecting bridge.
Figure 2:
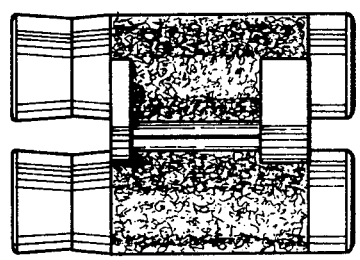
FIG. 2 is a slightly reduced plan view of the binocular telescope illustrated in FIG. 1 in an unfolded condition.
Figure 3:
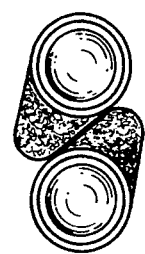
FIG. 3 is an end elevation of the binocular telescope of FIG. 2, as viewed from the objectives end.
Figure 4:
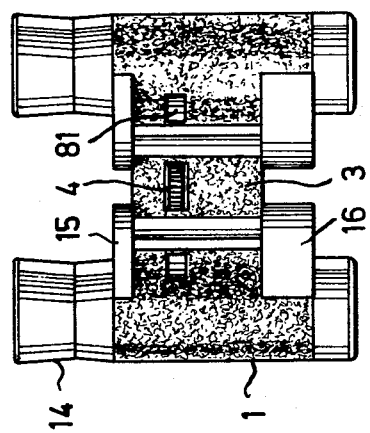
FIG. 4 is a plan view of the binocular telescope of FIG. 2, in a collapsed condition.
Figure 5:
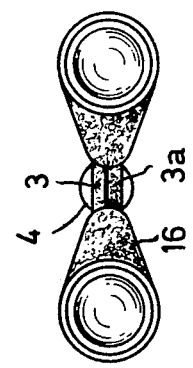
FIG. 5 is an end elevation, similar to FIG. 3 but for the collapsed condition of FIG. 4.
Figure 6:
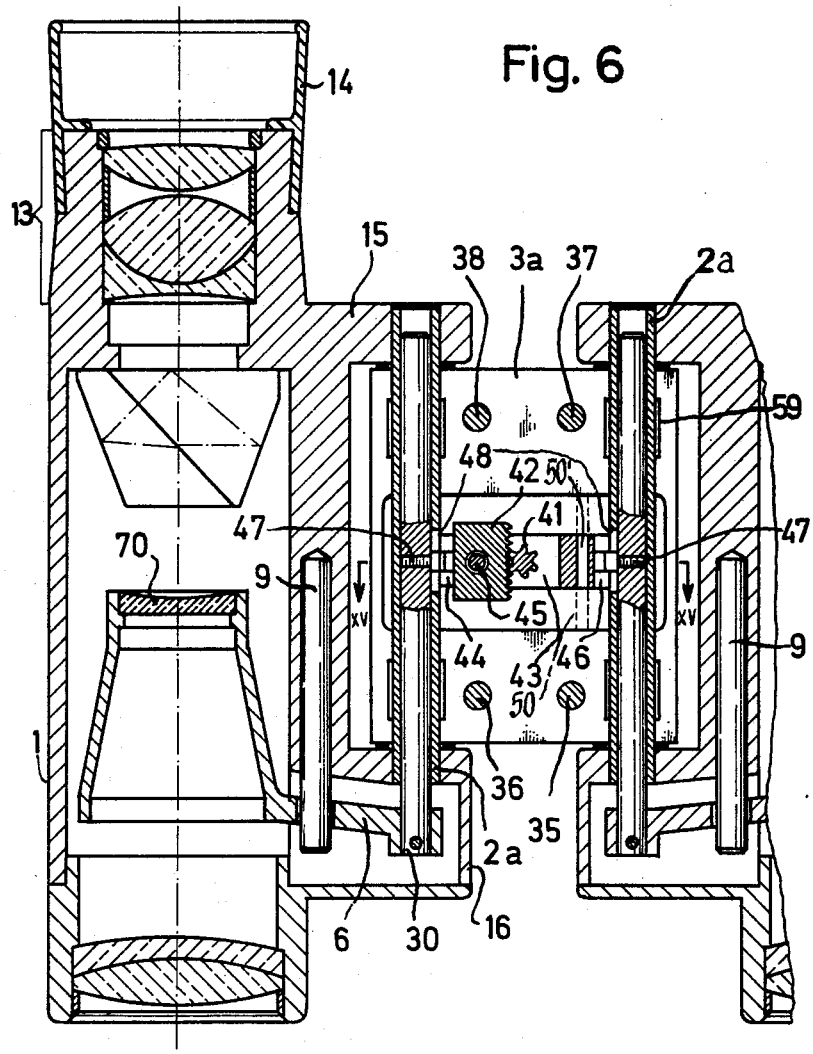
FIG. 6 is an enlarged fragmentary longitudinal section through a binocular telescope with double-articulated collapsible connecting bridge with hollow articulating pin connections and with a drive button mounted on an axis perpendicular to the plane of the articulating axes.

FIGS. 6 to 9 illustrate an embodiment of the invention in which the drive button is arranged such that its axis is perpendicular to the plane of the articulation axes, e.g., perpendicular to the general plane of the bridge which connects the two telescope halves, and parts which correspond to those described in connection with FIG. 1 are given the same reference numerals. The gear 41 is a fixed component part of the drive button 40 (not visible in FIG. 6) and is meshed with a rack 42 carried by a focusing yoke 43. When button 40 is rotated, gear 41 moves rack 42 and yoke 43 in a longitudinal direction. As shown (see FIGS. 6 and 9), yoke 43 is a composite of two bifurcated halves, secured by bolt 45. The right-hand of these parts bears the designation 43 and includes fork elements 46 deriving guided positioning support from the right-hand hollow articulation pin 2a. A guide tongue or rail 50 is an integral longitudinally extending inward formation on the upper bridge half 3 and extends into longitudinally stabilizing guided relation with a corresponding groove or channel 50' in the yoke member 43. The other yoke half is the rack portion 43, with similar fork elements 44 deriving guided positioning support from the left-hand hollow articulation pin 2a. Longitudinal, rack-driven yoke displacement is conveyed to the respective rods 30 by means of bolts 47 which engage opposite adjacent faces of each of the bifurcations, there being a suitable locally milled slot 48 in each of the hollow pins 2a, to permit the necessary travel of bolts, in the course of focusing adjustment. To complete the description, numeral 49 designates a ring having threaded engagement to the drive button 40, to retain the same rotatably assembled to the bridge part 3; and reference numeral 51 designates a serration provided on the drive button 49, for better finger engagement upon focusing.

Figure 10:
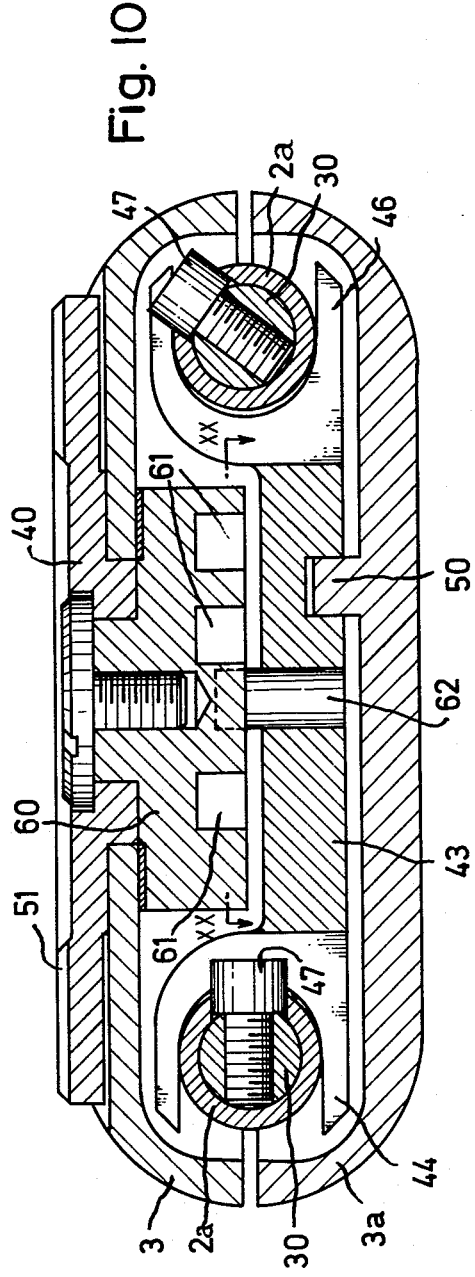
FIG. 10 is a view similar to FIG. 9, being a section through the bridge of a modified telescope construction in which the transmission of movement of the drive button is effected via a cam disc and follower pin.
Figure 11:
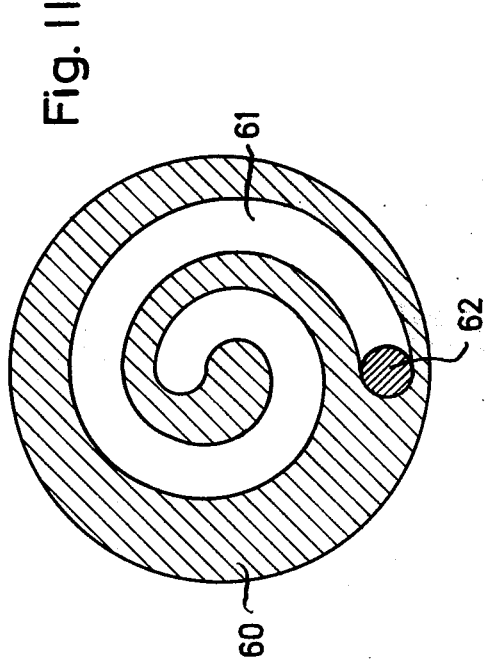
FIG. 11 is a sectional view taken in the plane XX—XX of FIG. 10.

In the embodiment of FIG. 10, a follower pin 62 is fixedly carried by a connecting yoke 43, having tongue-and-groove longitudinally guided relation at 50-50 with the lower bridge half 3a. A spiral-cam disc 60 is connected with the drive button 40. The cam profile is a recess 61 of width to locate the pin 62. Upon rotation of button 40 (and, hence, disc 60), pin 62 tracks the cam advance, to drive yoke 43 in longitudinal focusing displacements, the motion being imparted to rods 30 and to the focusing optical elements by means as described for FIGS. 6 to 9.

The variation of the inventive idea in FIG. 12 illustrates the possibility of transmitting focusing displacements longitudinally via a rod 90 which is longitudinally guided in the telescope housing 1, being secured at one end to the focusing mounting 7 and at the other end to an offset actuating arm 68, having stabilizing engagement with the adjacent articulation pin 2. Within the connecting bridge 3-3a, a yoke member 65 is longitudinally guided and is adjustably positioned, by rotary adjustment of the threaded end of drive button 4; forked ends of yoke 65 engage the respective arms 68 so that they may track longitudinal adjustments while also permitting bridge-to-telescope articulation.

FIG. 13 is similar to FIG. 12 but illustrates that it is also possible to develop the focusing movement by directly longitudinally moving the sliding yoke 65 and connected parts 68, 90, 6, it being understood that in such case a finger engageable portion of yoke 65 is exposed externally of one half, e.g., the half 3a, of the bridge.

What is claimed is:

1. A binocular telescope comprising two separate individual telescope housings with interior movable-lens mounts and elements for individual telescope systems, a bridge housing between said telescope housings and having separate spaced parallel hinged connections to each of the respective telescope housings, said hinged connections establishing an axially located relation of said bridge and telescope housings, the hinge axes being parallel to the telescope axes, each telescope housing and the associated movable-lens mount including two spaced parallel coacting elongate guide means so related as to assure (a) optical-axis alignment of the movable-lens element for all longitudinally adjusted positions thereof and (b) non-rotation of said movable-lens element with respect to the associated telescope housing, whereby articulation of either or both of the respective housings necessarily articulates the movable-lens elements associated therewith in exact correspondence regardless of the longitudinally guided positioning of said movable-lens elements, a bridge element contained within said bridge housing and extending between the axes of said hinge connections and including means having longitudinally guided relation to each of said hinge axes, selectively operable externally accessible adjustment means carried by said bridge housing and internally connected to said bridge element for adjusting the longitudinal position of said bridge element, whereby said bridge element may be longitudinally displaced regardless of the pivoted relation of said housings over a range of interocular adjustment of the spacing of telescope axes, and housing-contained lens-positioning means connecting each said movable-lens mount to said bridge element via that one of the hinge-connection axes which applies to the particular housing whereby there will be longitudinally coordinated positioning of said bridge element with respect to the movable-lens mount of each of said telescope systems.

2. A binocular telescope according to claim 1, in which the mount for each movable-lens mount comprises pin means on spaced parallel axes fixed with respect to the associated housing, one of said pin means being on the hinge axis for the associated housing.

3. A binocular telescope according to claim 2, in which one of said pin means is longitudinally movable, and in which for each said movable-lens mount said lens-positioning means includes one of said pin means for the applicable movable-lens mount.

4. A binocular telescope according to claim 3, in which for each movable-lens mount the longitudinally movable one of said pin means is on the applicable hinge axis.

5. A binocular telescope according to claim 1, in which one of said housings has an access opening offset from the optical axis thereof, said lens-positioning means extending through said opening.

6. A binocular telescope according to claim 1, in which each telescope system comprises an eyepiece non-adjustably mounted in the associated housing.

7. A binocular telescope according to claim 6, in which each of said eyepieces includes an invertible flexible eye cup for spectacle wearers.

8. A binocular telescope according to claim 1, in which said selectively operable adjustment means is mounted to said bridge housing on a rotary axis perpendicular to the plane of said articulation axes.

9. A binocular telescope according to claim 1, in which said selectively operable adjustment means is a rotary drive button, said bridge element including a laterally extending yoke adjacent each hinge axis, each said yoke being the means of longitudinally directed actuating connection to the guided longitudinally movable means of both said systems.

10. A binocular telescope according to claim 1, in which each telescope system comprises spaced objective and eyepiece elements, said movable-lens mount being intermediate the associated objective and eyepiece elements.

11. A binocular telescope according to claim 1, in which spaced parallel articulation pins connect said bridge housing to said telescope housings on the respective hinge axes.

12. A binocular telescope according to claim 11, in which said articulation pins are hollow and in which said lens-positioning means includes for each movable-lens mount a rod guided by the associated hollow articulation pin.

13. A binocular telescope according to claim 11, in which said articulation pins are hollow, and in which a pin carried with each movable-lens mount is slidably guided in the bore of the associated hollow articulation pin, and in which for each movable-lens mount said lens-positioning means includes for each telescope system a rod guided by the associated housing on an axis parallel to and offset from both the articulation axis and the telescope axis.

14. A binocular telescope according to claim 1, in which each of the telescope housings includes optical elements closing both ends, said movable-lens mount for each telescope being movable guided between said ends and therefore within its associated telescope housing.

15. A binocular telescope according to claim 1, in which said selectively operable adjustment means includes a screw-threaded portion and is rotatably mounted on an axis parallel to the articulation axes, said means coacting between said bridge element and said movable-lens mounts including means tracking the advance of said screw-threaded portion upon rotation thereof.

16. A binocular telescope according to claim 1, in which said selectively operable adjustment means is mounted to said bridge element on a rotary axis perpendicular to the plane of said articulation axes.

17. A binocular telescope according to claim 16, in which said selectively operable adjustment means includes a cam-and-follower connection between said bridge housing and said bridge element and responding to adjusted rotation about the rotary axis of said adjustment means.

18. A binocular telescope according to claim 16, in which said selectively operable adjustment means includes a rack and pinion connection between said bridge housing and said bridge element and responding to adjusted rotation about said rotary axis.

19. A binocular telescope according to claim 1, in which for each movable-lens mount one of said elongate guide means includes a longitudinal pin on the applicable hinge axis.

20. A binocular telescope according to claim 1, in which for each movable-lens mount each of said elongate guide means includes a longitudinal pin.

21. A binocular telescope according to claim 1, in which each telescope system comprises at one end of the telescope an eyepiece non-adjustably mounted in the associated housing.

22. A binocular telescope according to claim 1, in which said selectively operable adjustment means includes an externally exposed rotary drive button.

23. A binocular telescope according to claim 1, in which said bridge housing is a casing having an internal cavity extending between said hinged connections, and in which said bridge element is contained within the cavity of said bridge housing.

24. A binocular telescope, comprising twin telescope systems each contained within its own telescope housing, a bridge housing connecting said telescope housings in spaced parallel relation, articulation-pin means pivotally establishing the connection of said telescope housings to said bridge housing on spaced axes parallel to and offset from the telescope-system axes and offset from the center of the bridge housing, each telescope system including an internal axially movable focusing element having an offset support arm, each offset support arm being also engaged to the associated articulation-pin means, longitudinally extending guide-pin means carried by each telescope housing and engaging the associated offset support arm, whereby for each telescope system both said pin means cooperate with the associated offset support arm to totally stabilize optical-axis alignment of the associated focusing element regardless of the extent of articulation about said pin means, each telescope system containing longitudinally shiftable means associated with one of said pin means and in axially retained engagement with said offset support arm, longitudinally guided slide means carried by and contained within said bridge housing and internally connected to impart longitudinal displacement to both said longitudinally shiftable means, and externally exposed means for adjustably positioning said slide means with respect to said bridge.

25. A binocular instrument comprising two separate individual telescope housings each having a tubular passage with optical elements on a telescope axis extending through its associated passage, each housing including two radially offset fixed hinge arms at the same angular location and in substantial axially spaced relation, a bridge housing having relatively thin and substantially flat laterally extending ends, each such bridge housing end being axially located by and between the fixed arms of a different one of said housings, first hinge-pin means connecting a first bridge-housing end to both fixed hinge arms of one telescope housing and on an axis parallel to the associated telescope axis, second hinge-pin means connecting the other bridge-housing end to both fixed hinge arms of the other telescope housing and on an axis parallel to the associated telescope axis, said bridge housing retaining both hinge-pin means in spaced parallel relation, a focusing optical element and a support therefor movably carried by and within each telescope housing, means including two separate guides coacting between each focusing-element support and its associated telescope housing on spaced parallel axes for longitudinally guided positioning of said focusing element along the associated telescope axis, an actuating element rigid with each focusing-element support and accessible for bridge-mounted control connection substantially on the hinge-connection axis of the associated telescope housing, and a single bridge-mounted control mechanism including separate actuators within said bridge housing at the respective hinge-connection axes and in axial-positioning engagement with said respective actuating elements.

* * * * *